United States Patent
Wabnig et al.

(10) Patent No.: US 9,641,326 B2
(45) Date of Patent: May 2, 2017

(54) SECURED WIRELESS COMMUNICATIONS

(75) Inventors: Joachim Wabnig, Cambridgeshire (GB); Antti Niskanen, Cambridgeshire (GB); Hongwei Li, Cambridgeshire (GB); David Bitauld, Cambridgeshire (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/402,677

(22) PCT Filed: May 31, 2012

(86) PCT No.: PCT/IB2012/052745
§ 371 (c)(1),
(2), (4) Date: Nov. 20, 2014

(87) PCT Pub. No.: WO2013/179094
PCT Pub. Date: Dec. 5, 2013

(65) Prior Publication Data
US 2015/0172048 A1    Jun. 18, 2015

(51) Int. Cl.
*H04K 1/00* (2006.01)
*H04L 9/08* (2006.01)
(Continued)

(52) U.S. Cl.
CPC ......... *H04L 9/0858* (2013.01); *H04B 10/70* (2013.01); *H04L 9/14* (2013.01); *H04L 2209/24* (2013.01); *H04L 2209/80* (2013.01)

(58) Field of Classification Search
CPC .................................................. H04L 9/0858
(Continued)

(56) References Cited

U.S. PATENT DOCUMENTS 6,188,768 B1 * 2/2001 Bethune ............... H04L 9/0858
380/278
6,289,104 B1 * 9/2001 Patterson ............. H04L 9/0858
380/256
(Continued)

FOREIGN PATENT DOCUMENTS

GB          2441364 A       3/2008
WO       2012018246          2/2012

OTHER PUBLICATIONS

Laing et al., "Reference Frame Independent Quantum Key Distribution", Phys. Review, vol. 82, Mar. 4, 2010, pp. 1-5.
(Continued)

*Primary Examiner* — Peter Shaw
(74) *Attorney, Agent, or Firm* — Harrington & Smith

(57) ABSTRACT

The disclosure relates to secured wireless communications. A sender device emits randomly photons in a first polarization, a second polarization and a third polarization without aligning a polarization system in a plane perpendicular to the first and second polarizations with a recipient device. The recipient device is adapted for detection of events in association with six polarizations. The recipient device selects randomly polarization basis for measurement of the received photons. Information of detected events in association with three basis is communicated to the sender device. The information from the recipient device and information stored in the sender device is processed to determine events where same polarization basis was used by the sender device and the recipient device.

10 Claims, 8 Drawing Sheets

(51) Int. Cl.
*H04B 10/70* (2013.01)
*H04L 9/14* (2006.01)

(58) Field of Classification Search
USPC ........................................................ 380/256
See application file for complete search history.

(56) References Cited

U.S. PATENT DOCUMENTS

| | | | |
|---|---|---|---|
| 8,054,976 B2 | 11/2011 | Harrison et al. | |
| 2004/0109564 A1* | 6/2004 | Cerf ...................... | H04L 9/0858 380/256 |
| 2006/0059403 A1* | 3/2006 | Watanabe ............. | H04L 9/0858 714/758 |
| 2008/0310856 A1 | 12/2008 | Poppe | |
| 2010/0080394 A1 | 4/2010 | Harrison et al. | |
| 2010/0208893 A1 | 8/2010 | Toyoshima et al. | |
| 2010/0241912 A1* | 9/2010 | Kwok ................... | H04L 9/0858 714/704 |
| 2011/0075839 A1* | 3/2011 | Noh ...................... | H04L 9/0858 380/44 |
| 2012/0039617 A1 | 2/2012 | Duligall et al. | |
| 2012/0087500 A1 | 4/2012 | Ukita et al. | |
| 2012/0195430 A1 | 8/2012 | Niskanen et al. | |

OTHER PUBLICATIONS

Mackay, "Information Theory, Inference and Learning Algorithms", Cambridge University Press, Version 6.0, Jun. 26, 2003, 640 Pages.

Scarani et al., "The security of practical quantum key distribution", Reviews of Modern Physics, vol. 81, No. 3, Jul.-Sep. 2009, pp. 1301-1350.

"Quantum Cryptography: Privacy Through Uncertainty", ProQuest, Retrieved on Jan. 20, 2015, Webpage available at : http://www.csa.com/discoveryguides/crypt/overview.php.

Sharma, "Quantum Cryptography: A New Approach to Information Security", International Journal of Power System Operation and Energy Management (IJPSOEM), vol. 1, Issue: 1, 2011, pp. 11-13.

International Search Report and Written Opinion received for corresponding Patent Cooperation Treaty Application No. PCT/IB2012/052745 , dated Jun. 17, 2013, 14 pages.

Lana S. et al. "Finite-key security against coherent attacks in quantum key distribution.", Pub, Dec. 2001 2010, vol. 12, No. 12, p. 123019.

Liu X.B. et al. "Quantum key distribution system with six polarization states encoded by phase modulation.", Pub, Nov. 2000 2008, vol. 25, No. 11, pp. 3856-3859.

Li J-L. et al. "Six-State Quantum Key Distribution Using Photons with Orbital Angular Key Distribution Using Photons with Orbital Angular Momentum." Pub, Nov. 2001 2010, vol. 27, No. 11 p. 110303.

Brierley, Stephen, "Quantum Key Distribution Highly Sensitive to Eavesdropping", arxiv.org, Cornell University Library, 201 Olin Library Cornell University, Ithaca, NY 14853, Oct. 14, 2009 , 19 pgs.

* cited by examiner

SECURED WIRELESS COMMUNICATIONS

RELATED APPLICATION

This application was originally filed as PCT Application No. PCT/IB2012/052745 filed May 31, 2012.

This disclosure relates to wireless communications and more particularly to secured wireless communications.

In wireless communications wireless channels are provided between two or more nodes such as fixed and/or mobile communication devices, access points such as base stations, servers, machine type devices, and so on. Examples of wireless systems include public land mobile networks (PLMN) such as cellular networks, satellite based communication systems and different wireless local networks, for example wireless local area networks (WLAN) and/or Worldwide Interoperability for Microwave Access (WiMax). A device for such systems is provided with appropriate signal receiving and transmitting apparatus for enabling communications with other parties. Wireless systems enable mobility for users where a mobile device can communicate over an air interface with another communication device such as e.g. a base station and/or other user equipment.

Data transmissions between parties may need to be secured. Applications, for example banking, shopping, email and so on, may rely on secure transactions over the Internet or other networks open to attacks. Increase in Internet commerce and transfer of computing tasks to remote servers (e.g. "cloud computing") has emphasized the need to maintain appropriate security of communications. Security can be provided based on a cryptographic protocol. Current cryptographic schemes (e.g. public key encryption) rely on the hardness of solving certain mathematical problems. For example, the commonly used RSA encryption algorithm is based on the hardness of factoring a large number into its prime factors. This is a hard problem using standard computer technology but can become solvable with development of more powerful computing technologies, for example by a future quantum computer. In the context of mobile communications an issue may arise in that the mobile devices are often handheld or otherwise portable and thus should be as lightweight and simple as possible. Because of the mobility of the devices their location relative to the other party might not be known.

It is noted that the above discussed issues are not limited to any particular communication environments and apparatus but may occur in any context where security is needed for wireless communications.

Embodiments of the invention aim to address one or several of the above issues.

In accordance with an embodiment there is provided a method comprising emitting from a sender device randomly photons in a first polarisation, a second polarisation and a third polarisation without aligning a polarisation system in a plane perpendicular to the first and second polarisations with a recipient device, the recipient device being adapted for detection of events in association with six polarisations, receiving information of detected events from the recipient device, and processing the received information and stored information to determine events where same polarisation basis was used by the sender device and the recipient device.

In accordance with an embodiment there is provided a method comprising receiving at a recipient device photons from a sender device via an optical channel emitted on a first polarisation, a second polarisation and a third polarisation without aligning a polarisation system in a plane perpendicular to the first and second polarisations with the sender device, selecting randomly polarisation basis for measurement of received photons for detection of events on six polarisations, sending information of detected events in association with three basis to the sender device, and receiving information from the sender device of events where same polarisation basis was used by the sender device and the recipient device.

In accordance with an embodiment there is provided an apparatus configured to cause emission of photons using randomly a first polarisation, a second polarisation and a third polarisation for sending the photons without aligning a polarisation system in a plane perpendicular to the first and second polarisations with a recipient device, the recipient device being adapted for detection of events in association six polarisations, and process information of detected events received from the recipient device and information stored in the sender device to determine events where same polarisation basis was used by the sender device and the recipient device.

In accordance with an embodiment there is provided an apparatus configured to randomly select basis for measurement of photons received from a sender device emitted on a first polarisation, a second polarisation and a third polarisation without aligning a polarisation system in a plane perpendicular to the first and second polarisations, and detect events in association with said six polarisations, cause sending of information of detected events, and receive information of events where the same polarisation basis was used by the sender device and the recipient device.

In accordance with a more detailed embodiment a raw key is determined based on events where the first polarisation and/or second polarisation basis was used by the sender device and the recipient device.

Certain predefined events dependent of the use of bases can be used for parameter estimation.

The received information and stored information may be compared to determine bits for a raw key and bits for error correction.

Bit values for use in error correction may be communicated when use of the same basis for at least one event is determined.

The polarisations may be provided on the Poincare sphere. The polarisations by a sender device may comprise a main polarisation, an opposite to the main polarisation and a polarisation perpendicular to the main polarisation.

Key distribution rate may be controlled based on distribution between polarisations.

Synchronised timing may be used in association with the events. A time synchronised record of events detected by the recipient device may be correlated with a record of events maintained by the sender device, and the information obtained may be sifted to obtain raw keys based on bits in times when the same basis was used by the sender and recipient devices.

A mobile device and/or a base station arranged to implement the embodiments may also be provided.

A computer program comprising program code means adapted to perform the herein described methods may also be provided. In accordance with further embodiments apparatus and/or computer program product that can be embodied on a computer readable medium for providing at least one of the above methods is provided.

It should be appreciated that any feature of any aspect may be combined with any other feature of any other aspect.

Embodiments will now be described in further detail, by way of example only, with reference to the following examples and accompanying drawings, in which.

In the following certain exemplifying embodiments are explained in the context of wireless or mobile communications where secure communications are provided for a mobile communication device. A mobile device for communications with e.g. a base station is often referred to as user equipment (UE) or terminal. A mobile device for implementing the embodiments may be provided by any device capable of sending wireless signals to and/or receiving wireless signals on a wireless channel. The mobile device is also provided with apparatus for communication on an optical channel. Non-limiting examples of mobile devices include a mobile station (MS) such as a mobile phone or what is known as a 'smart phone', a portable computer such as a laptop, tablet or a personal data assistant (PDA) provided with wireless communication capabilities, or any combinations of these or the like. An appropriate mobile device is provided with at least one data processing entity, at least one memory, and other possible components for use in software and hardware aided execution of tasks it is designed to perform, including control of communications with other parties and features relating to secure communications. The data processing, storage and other relevant control apparatus can be provided on an appropriate circuit board and/or in chipsets.

A quantum key distribution system is used in the below described embodiments for securing mobile communications. A possible use case can be a mobile device establishing a shared key with a stationary terminal. Cryptographic schemes that use properties of quantum mechanical systems to distribute a secure key are considered as providing high levels of security. For example, the current belief is that even a powerful eavesdropper who would only be limited by the laws of physics should not be able to compromise the security of the scheme. Implementations of quantum key distribution schemes rely on sending single photons between two terminals. In accordance with an embodiment a lightweight quantum key distribution arrangement suitable for mobile use is provided where the need for precise alignment of polarisation can be avoided.

Figure 1:
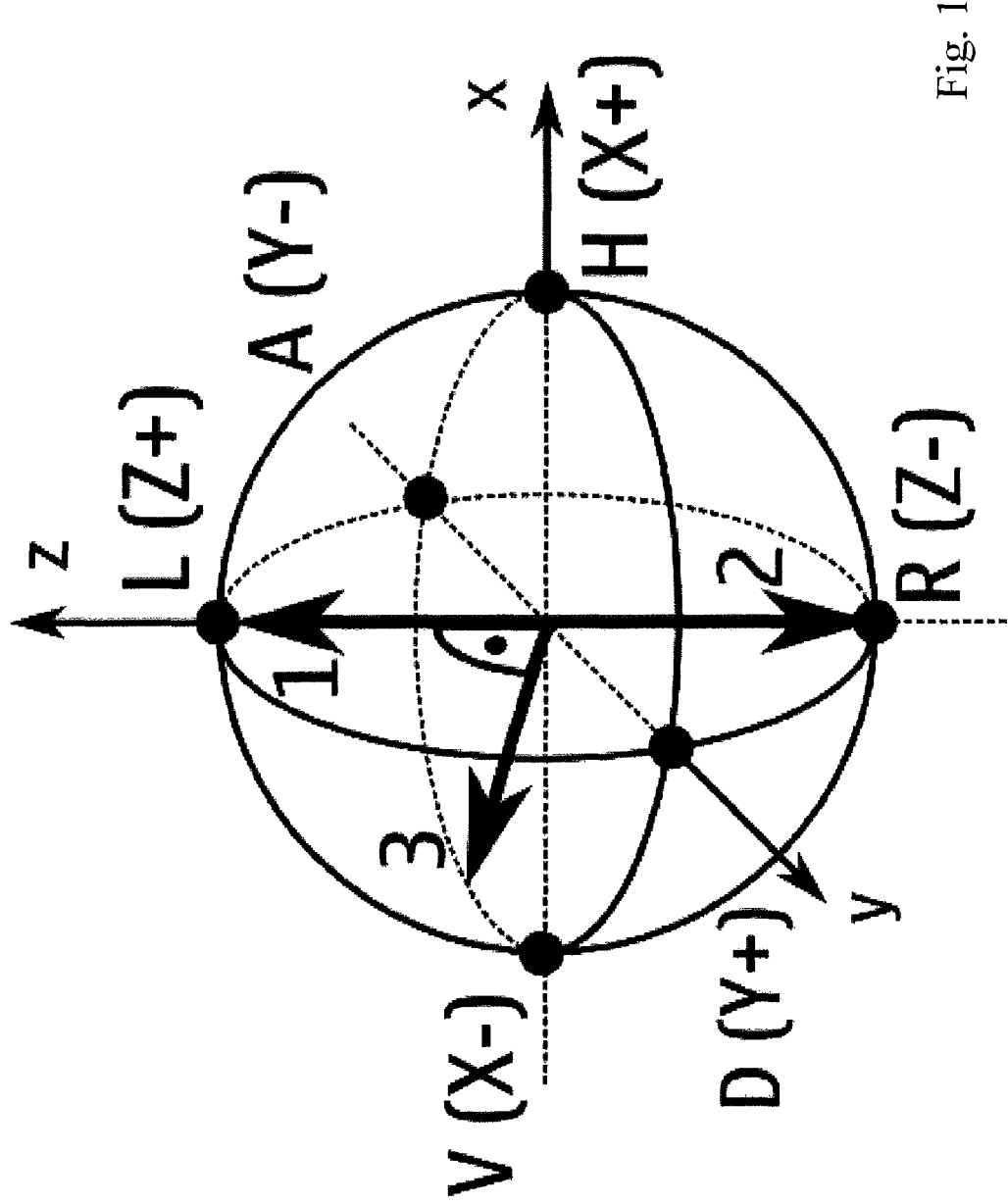
FIG. 1 shows polarisations on a Poincare sphere.

Before explaining possible terminal devices in more detail, a reference is made to a possible polarization system is represented on a Poincare sphere in FIG. 1. Perpendicularity of different polarizations can be defined on the Poincare sphere which is different from perpendicularity of polarization directions in a real space. The term perpendicular is used herein in this manner throughout this document. It is noted that terms polarisation basis and polarisation (direction) refer to different features. The polarisation can be denoted for example as H, V, A, D, L, R. Polarisation pairs form each a basis (H, V), (A, D), and (L, R).

A sender device can emit single photons of three possible polarisations on what is known as the Poincare sphere shown schematically in FIG. 1. The possible polarisations, or states, can be a main polarisation (1), its exact opposite (2) and a polarisation perpendicular to the main polarisation (3). A second or recipient devise can be adapted to measure the polarization in six directions. These polarisations can be the main direction and its opposite, two mutually perpendicular polarisations which are also perpendicular to the main polarisation, and their two opposites.

Figure 2:
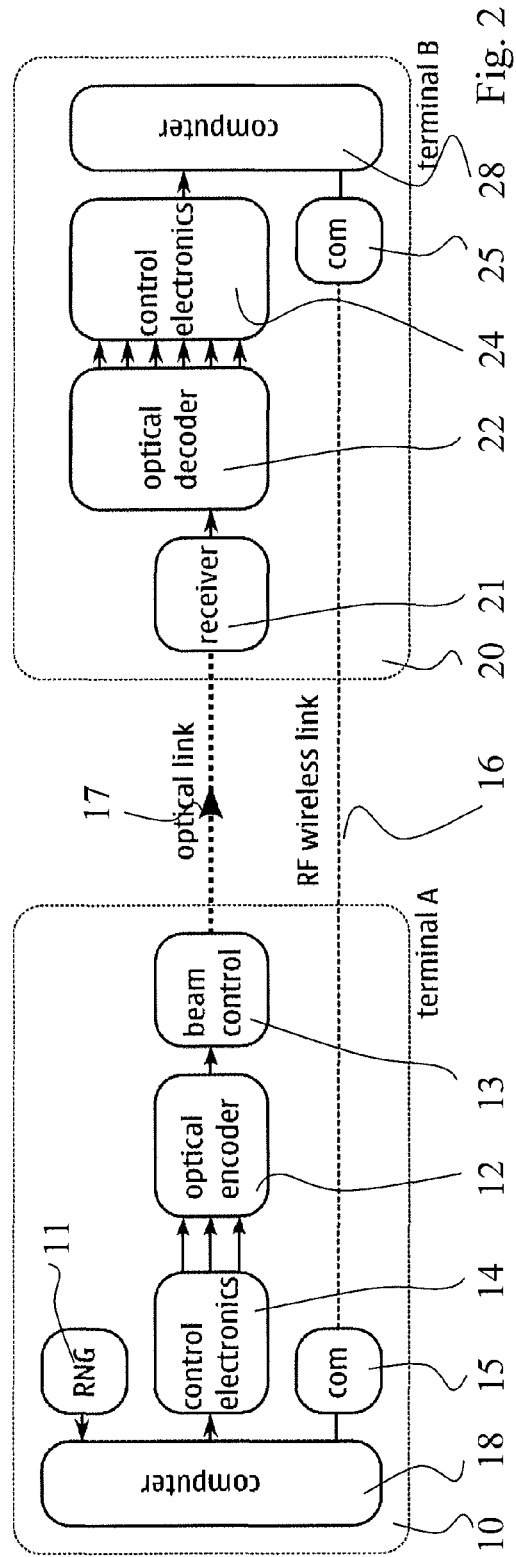
FIG. 2 shows a schematic diagram of two devices in accordance with an embodiment.

A quantum key distribution scheme can be provided between two devices. FIG. 2 shows a sender device 10, labelled terminal A, and a recipient device 10, labelled terminal B. In accordance with an embodiment terminal A comprises a mobile device, for example a mobile phone or a smartphone, a laptop, a notebook, a tablet computer and so forth and terminal B comprises a fixed node, for example a base station of a cellular system or a local network system.

In FIG. 2 a radio frequency (RF) wireless link 19 is provided between devices 10 and 20. Both devices are provided with a communications subsystem for the wireless communications, for example appropriate radio apparatus 15 and 25, respectively, to facilitate wireless communications on link 16. It is noted that a wireless channel between the devices can also be provided based on other technologies, such as via an optical link.

Distribution of keys between devices 10 and 20 is based on sending of photons from device 10 to device 20 over optical link 17. In accordance with an embodiment single photons are sent in each polarisation. Apparatus for generating and emitting the photons can comprise an optical encoder 12 emitting single photons, a beam controller 13 which allows directing the photons towards the recipient device, control electronics 14 for creating the electrical pulses needed to emit single photons, a (quantum) random number generator 11, and a processor apparatus 18 for controlling these components. The apparatus 12 for optical encoding can be adapted to probabilistically convert light pulses emitted by the three light sources into a single photons polarised in three possible polarisations. Each light source can correspond to one polarisation. Two examples of the optical encoder are discussed below with reference to FIGS. 3 and 4.

Figure 3:
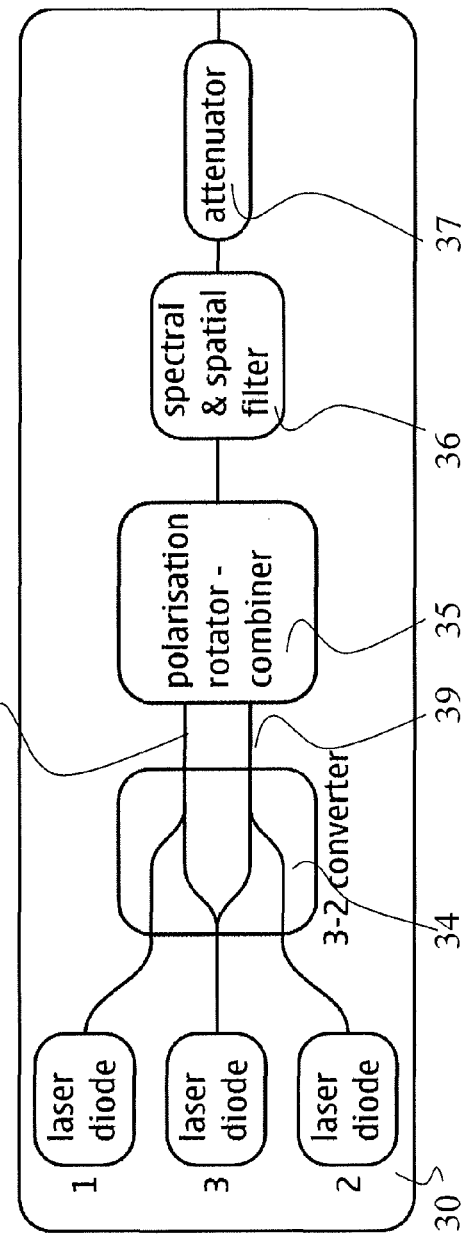
FIGS. 3 and 4 show block diagrams of exemplifying optical encoders.

In accordance with the example shown in FIG. 3 an optical encoder 30 comprises three light sources 1, 2, 3. The light sources can be provided by any appropriate source, for example by laser diodes or light emitting diodes (LEDs). A 3-2 converter 34, a polarisation rotator—combiner 35, a spectral and spatial filter 36 and an attenuator 37 are also provided. Light generated by the light sources 1-3 can be converted to dual-rail encoding by the 3-2 converter such that light source 1 creates a pulse on a first rail 38 and light source 2 creates a pulse on a second rail 39 whilst light source 3 creates a pulse on both rails. The intensity of the pulse generated by light source 3 can be equal on both rails.

Figure 4:
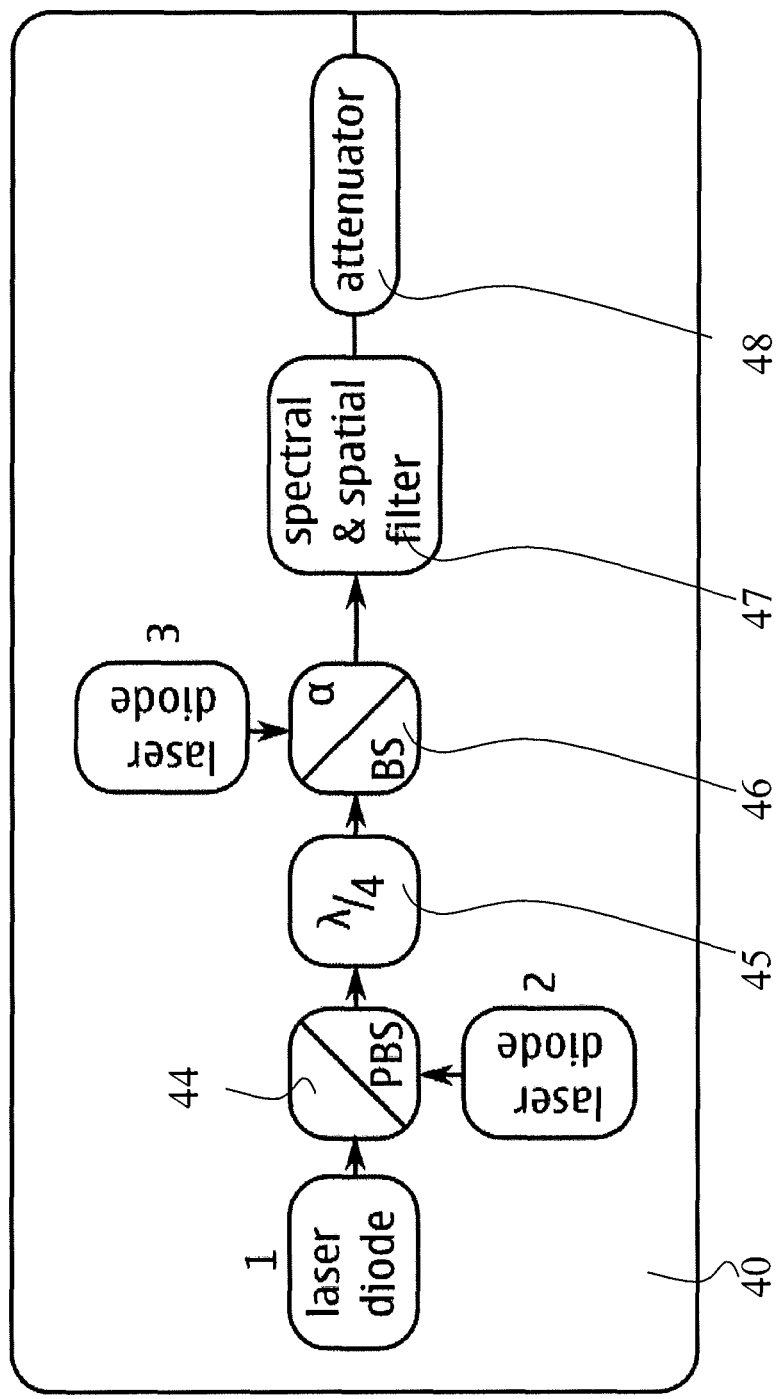

In the encoders of FIGS. 3 and 4 three polarisations can be used. The decoders of FIGS. 5 and 6 can measure six polarisations (two in each basis).

In accordance with a possibility the 3-2 converter apparatus can be implemented as integrated waveguides on a chip. The 3-2 converter can comprise a 50-50 beam splitter and two y-junctions connected as depicted in FIG. 3. The polarisation rotator—combiner 35 converts the dual rail encoding into the polarisation encoding (1, 2, 3). After that a spectral and spatial filter is applied to ensure that the three pulses are indistinguishable due to their spatial and frequency characteristics. Attenuation is applied before the photons exit the apparatus to bring the light pulses down to single photon level. Thus the attenuator 37 is provided as the last element of the optical encoder. The attenuation can be used to introduce a probabilistic element as the attenuation can be chosen in such a way that the average photon number per pulse is much smaller than one.

In probabilistic sources a strong light pulse is attenuated in such a way that it contains on average a photon number much smaller than one. As a result of the attenuation most of the pulses contains no photons, a small number contains one photon and an even smaller number contains multiple photons.

A problem that can arise when using attenuated light is that a small fraction of pulses can contain more than one photon. This may in certain occasions make the key distribution open to a photon number splitting attack where an eavesdropper intercepts one photon while letting the second one pass to terminal B. A technique that can be used to detect photon number splitting attacks is to use pulses with a variable number of photons. A variant of the scheme implementing decoy states can be provided by means of a tuneable attenuator. A second embodiment of the optical encoder addressing these is shown in FIG. 4. An apparatus 40 according to this embodiment can comprise three light sources 1 to 3, a polarising beam splitter (PBS) 44, a quarter wave plate ($\lambda/4$) 45, a beam splitter 46, a spectral and spatial filter 47, and an attenuator 48.

A single photon based scheme can be provided also in various other ways. According to a possibility true single photon emitters are used. In these each input pulse is converted to a single photon. No further attenuation at the end of a circuit is need. Another example is heralded single photon sources. In these, whenever a single photon is produced a second signal announces the presence of a single photon. Other events can be rejected.

Light sources 1 and 2 emit into the two arms of the polarising beam splitter (PBS) 44. After the PBS the originally linear polarisation (H, V) is converted to circular (L, R) by the quarter wave plate 45. The pulses then pass a beam splitter (BS) 46 with reflectivity $\alpha$. The third light source 3 emits into the other arm of the beam splitter. A pulse in light source 1 creates a pulse of a first polarisation after the BS, similarly for diodes 2 and 3. Spectral and spatial filtering is the same as in the example of FIG. 3.

Terminal B (see FIG. 2) can comprise a receiver that is able to receive a beam from terminal A. An optical decoder 22 capable of detecting single photons and their polarisation along three axes i.e. capable of providing six possible outputs is also provided. Control electronics 24 adapted for processing detector outputs and record their time trace, a communications subsystem 25 for the wireless communication, and a computer or processor 26 for controlling the above components are also shown.

Figure 5:
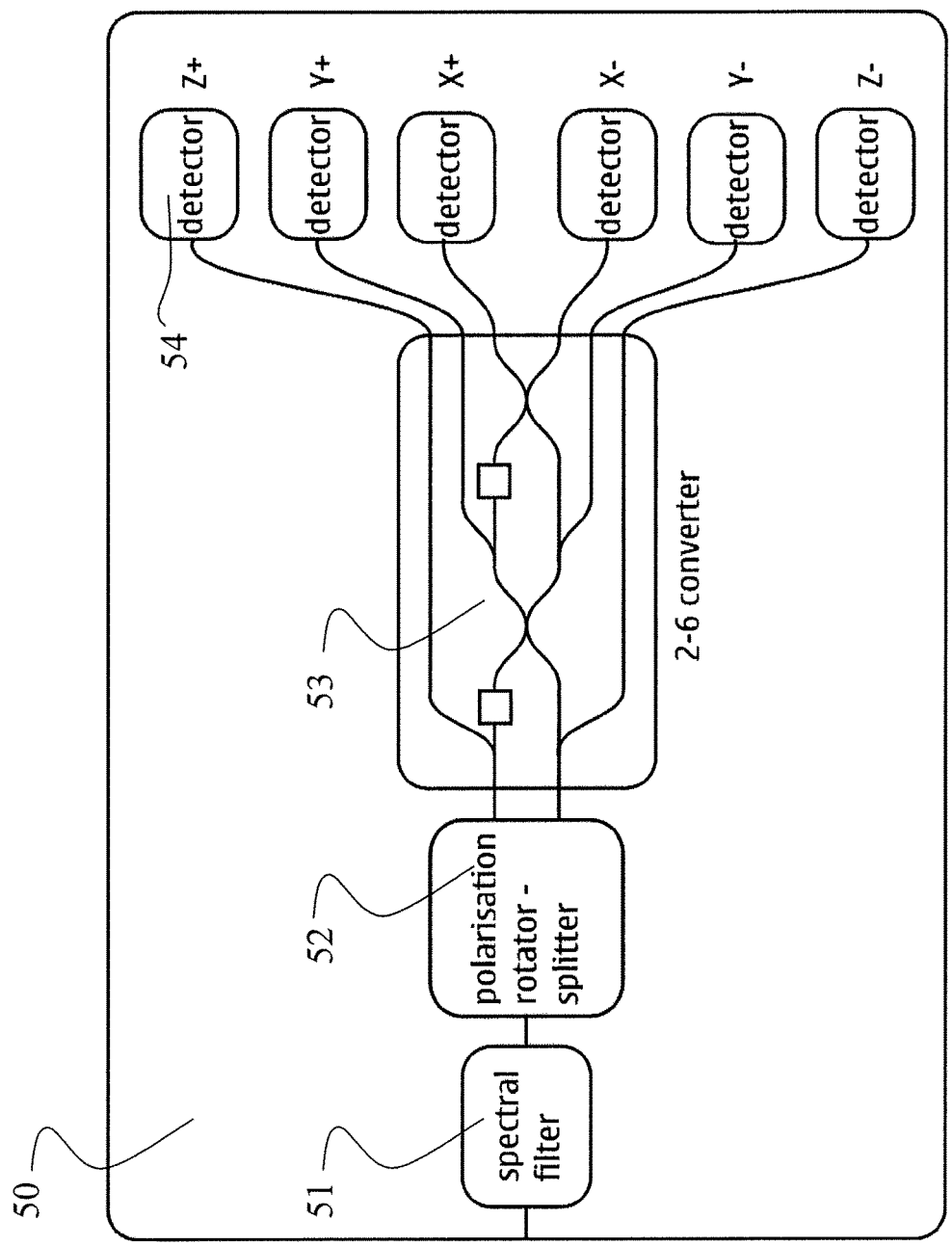
FIGS. 5 and 6 show block diagrams of exemplifying optical decoders.

Two different exemplifying implementations of the optical decoder for the recipient device 20, or terminal B of FIG. 2, are now discussed with reference to FIGS. 5 and 6. In FIG. 5 example a decoder 50 is provided that comprises a spectral filter 51 to filter out ambient light and allow only light sent from terminal A. A polarisation rotator—splitter 52 is provided to convert the photon polarisation to dual rail encoding, a 2-6 converter 53 is used to convert dual rail encoding to six separate channels. Six single photon detectors 54 (e.g. avalanche photodiodes) are also shown.

The 2-6 converter 53 can be implemented as integrated waveguides on a chip. A possible layout of the chip is shown in FIG. 5. The 2-6 converter can consist of 2 beamsplitters, two phaseshifters and four y-junctions. The transmission of the y-junctions can be adjusted to influence the relative frequency of detection events.

Figure 6:
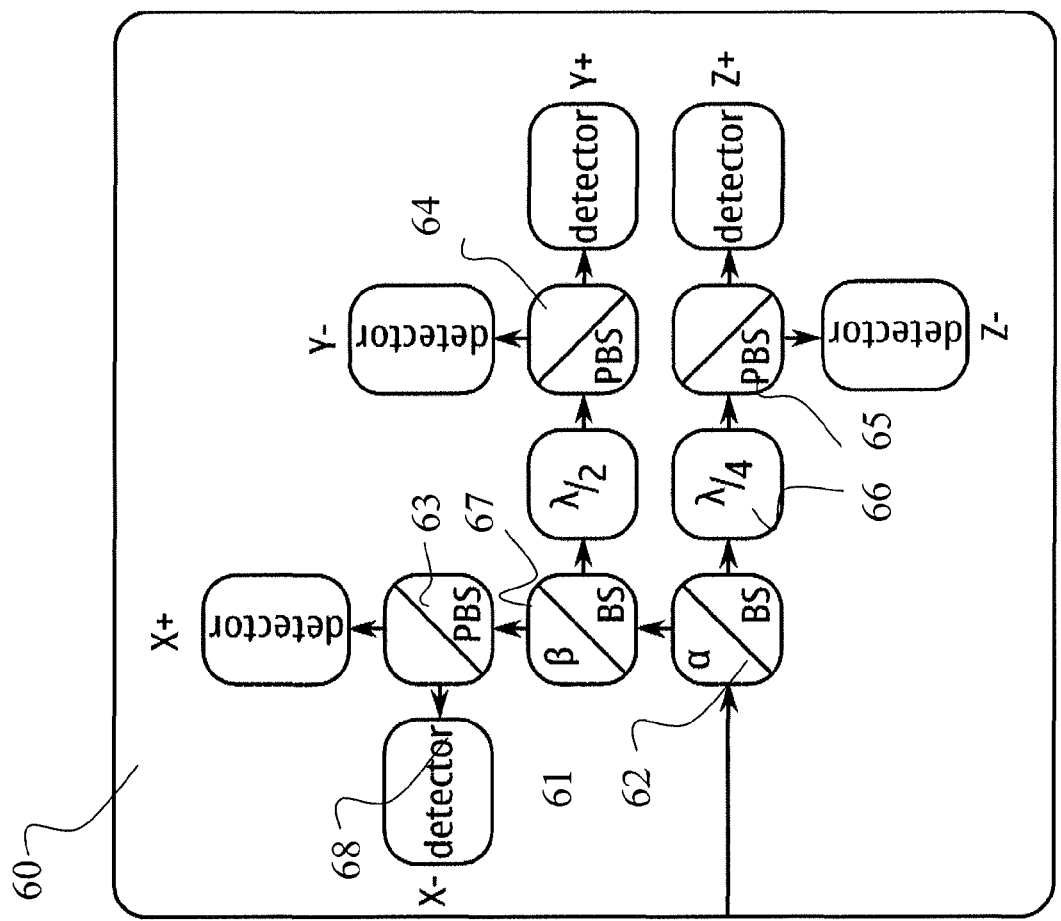

Another example for a decoder 60 shown in FIG. 6. Two beamsplitters (BS) 61, 62 with reflectivities $\alpha$ and $\beta$, respectively, three polarising beamsplitters (PBS) 63-65, a quarter wave plate 66, a half wave plate 67, and six single photon detectors 68 (e.g. avalanche photodiodes) are shown. Each block of two detectors 68 with their adjoining polarising beam splitter can detect if a photon is horizontally or vertically polarised. Thus, to detect in the x-direction (see FIG. 1) no additional polarisation rotation is necessary. The half wave plate rotates the z-direction (L,R) to the x-direction (H,V), while the quarter wave plate rotates y-direction (A,D) to the x-direction (H,V), so that they can be detected by the polarizing beam-splitter-detector assembly. The two beam splitters with reflectivity $\alpha$ and $\beta$, respectively, determine the relative frequency of detection in three bases.

The local polarisation coordinate systems for terminal A and terminal B are not aligned in the xy-plane. Choice of (L,R) coordinates for the z-direction can be used to stabilise the system against perturbations.

A secure shared key can be obtained by means of this hardware. In the embodiment a unique combination of reference frame independence with a three state protocol is provided. In accordance with a possibility an explicit implementation of the protocol using integrated or bulk optics can be provided. This can be combined with a lightweight design tailored for handheld short-range line-of-sight use.

Figure 7:
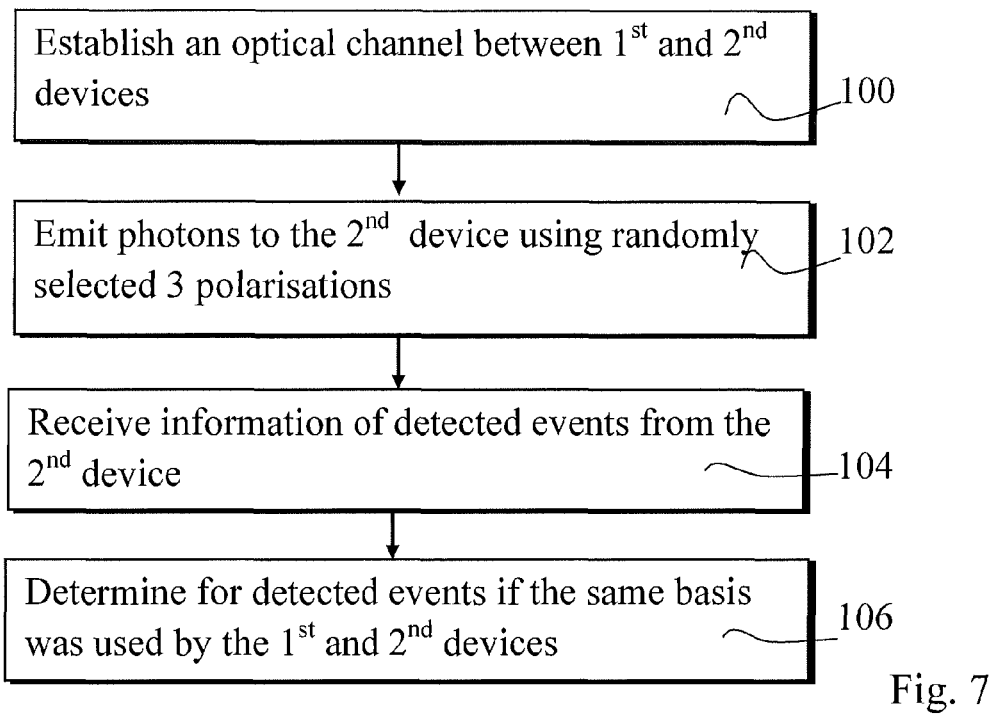
FIGS. 7 to 9 show flowcharts according certain embodiments.

In accordance with an embodiment an operation according to the flowchart of FIG. 7 is provided at a sender device. An optical channel is established at with a recipient device at 100 for emission of photons in a first polarisation, a second polarisation and a third polarisation without aligning a polarisation system in a plane defined based on the first and second polarisations with the recipient device. The plane can be defined as being perpendicular to the first and second polarisations. It is noted that perpendicular in here refers to polarisation directions on the Poincare sphere, and not directions in real space. Photons are emitted at 102 in the direction of the recipient device using randomly the first, second and third polarisations as the basis for sending the photons. The sending takes place in arrangement where the recipient device is capable of detecting events in association with six polarisations. Information of detected events is then received at 104 from the recipient device. The sender device processes at 106 the received information and information stored in the sender device to determine events where the same basis was used by the sender device and the recipient device.

This information can be used in generation of raw keys and/or detection of eavesdropping. For example, it can be determined based on comparison of the received and stored information which bits are to be used for the raw key and which bits are to be used for error correction. For example, when a bit in a first or a second polarisation was sent and the measurement basis was along one/two the bits are used for the raw key. Thus only events where polarisation one or two was sent and measured contribute to a raw key. All other combinations containing the third direction enter to other procedures to determine secure key rate and/or corresponding shortening of the raw key using hash functions. Events where the third polarisation is sent and measured may not contribute to the raw key. More detailed examples of these operations will be explained with reference to FIG. 9.

The number of polarisations of the sender device can be more than three. The three polarisations comprise two opposite polarisations, the third being in a plane perpendicular to the two opposite polarisations. Additional polarisations can be added so that the added polarisation is perpendicular or opposite the other polarisations. In accordance with an embodiment the sender device is configured to send four or five polarisations.

Figure 8:
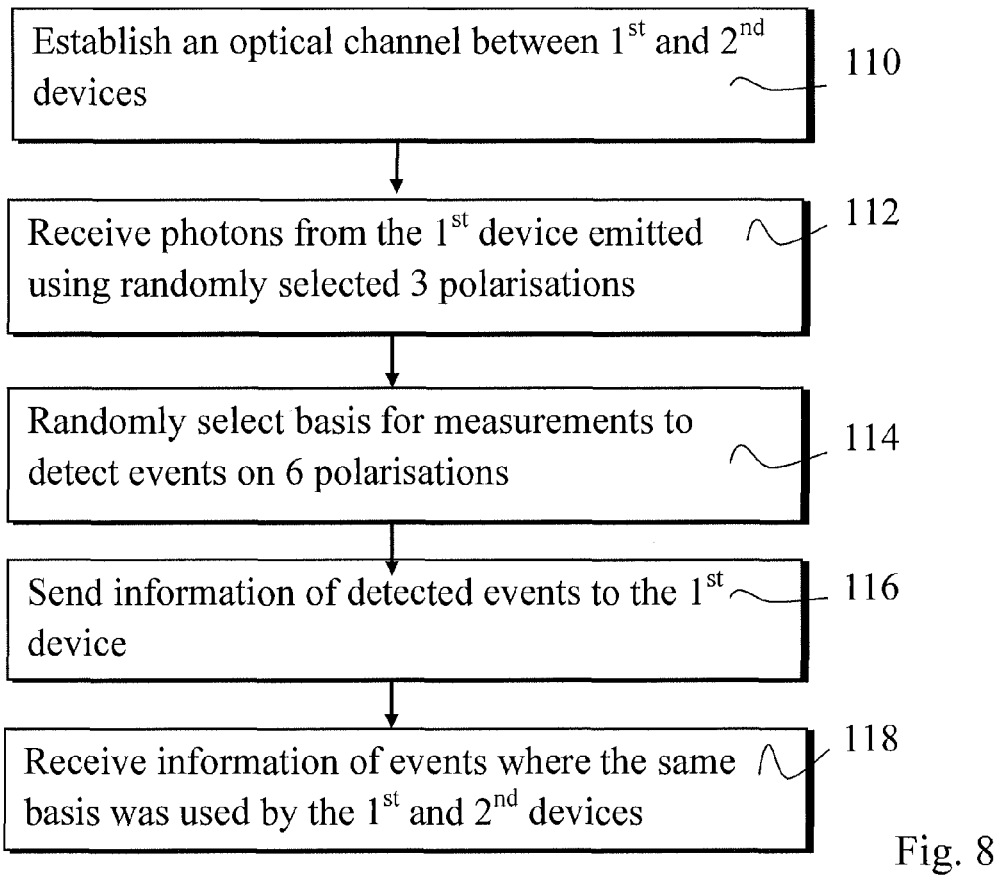

FIG. 8 shows actions taken by the recipient device. After establishment of the optical channel at 110 the recipient device receives at 112 from the sender device photons via the optical channel based on a first polarisation, a second polarisation and a third polarisation. Alignment of a polarisation system in a plane perpendicular to the first and second polarisations is not necessary. Basis for measurement of received photons for detection of events on six polarisation bases is randomly selected at 114. Information of detected events in association with three basis is then sent at 116 to the sender device. Thus in steps 112 and 116 information only about the three basis is sent and information of the polarisations is not exchanged as this could reveal the key. Information is then received at 118 from the sender device regarding events where the same basis was used by the sender device and the recipient device. Examples of use of this information will be given below with reference to FIG. 9.

Figure 9:
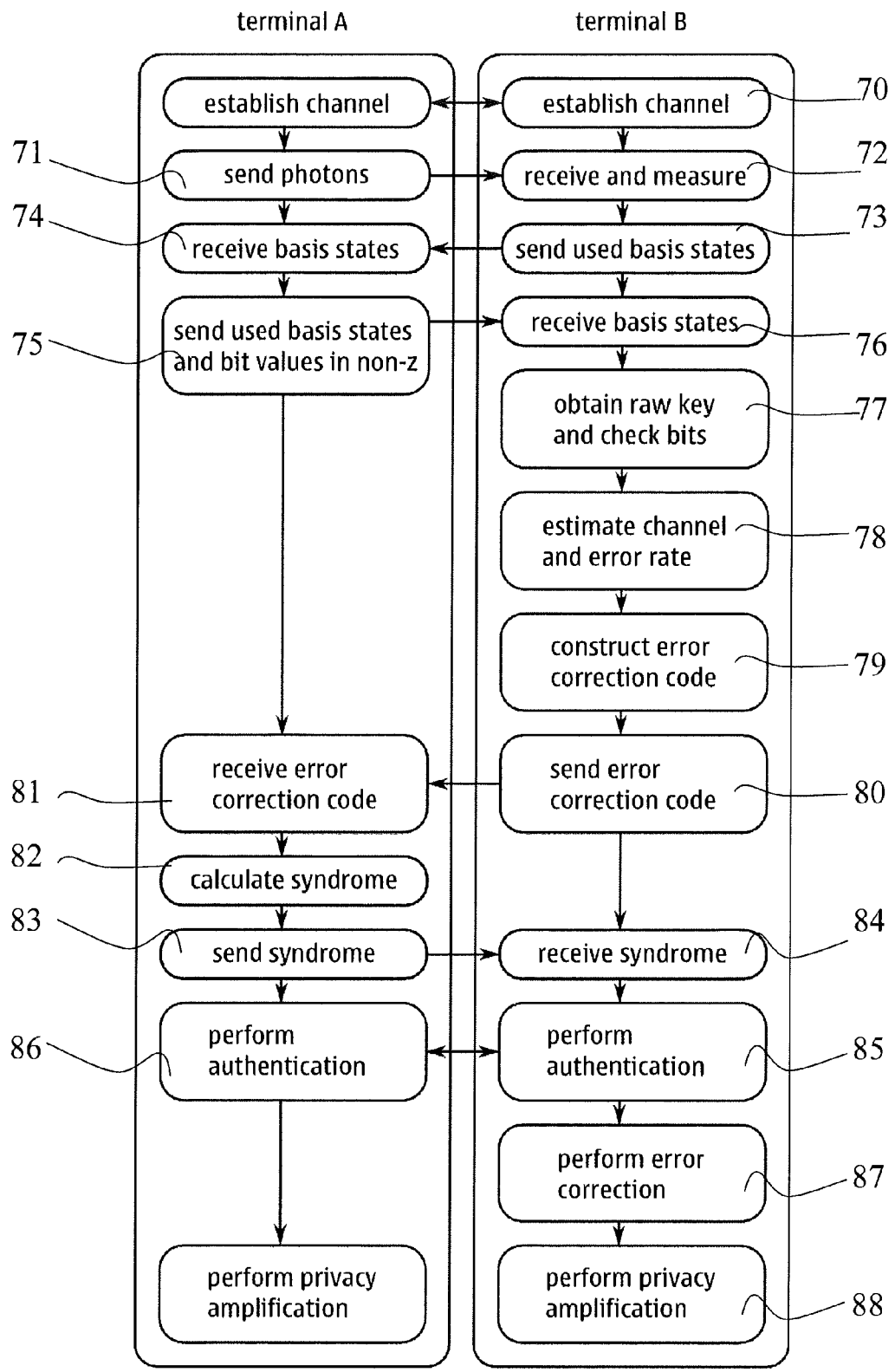

A more detailed procedure for distributing a key between the first and recipient devices in accordance with an embodiment is shown in FIG. 9 for the terminals shown in FIG. 2. An optical channel is established between terminal A and terminal B at 70. A steering mechanism consisting of e.g. movable mirrors and/or other optical elements (e.g. lenses, pinholes, spatial phase modulators) can be used to direct the light beam from terminal A to terminal B as well as adjusting the receiver in terminal B in a way to receive the beam from terminal A. Once the optical channel is established terminal A can start sending photons to terminal B at 71. There is no need to align polarisations coordinate systems are in the XY plane. The sender basis can be chosen at this stage in a truly random way. In accordance with a possibility a quantum random number generator can act as a source for the randomness. The random number generator can be operated in real-time or fill up a random number buffer for later use.

Distribution between the three possible sender states can be used influence the final key distribution rate. The distribution can be chosen such that the key rate can be optimised.

Light sources s in terminal A may be activated periodically with a fixed period. This allows suppression of dark counts on the receiver side.

After appropriate attenuation only a small fraction of time slots may contain a photon. Terminal B receives and detects at 72 the photons and records their arrival time. The design of the optical decoder can be such that the measurement basis is chosen randomly.

In order to allow the suppression of random counts the clocks of terminal A and terminal B are synchronised. This can be provided for example by sending a clocking signal between terminal A and terminal B as part of a transmission or by adjusting the clock in terminal B in order to maximise the count rate.

Figure 10:
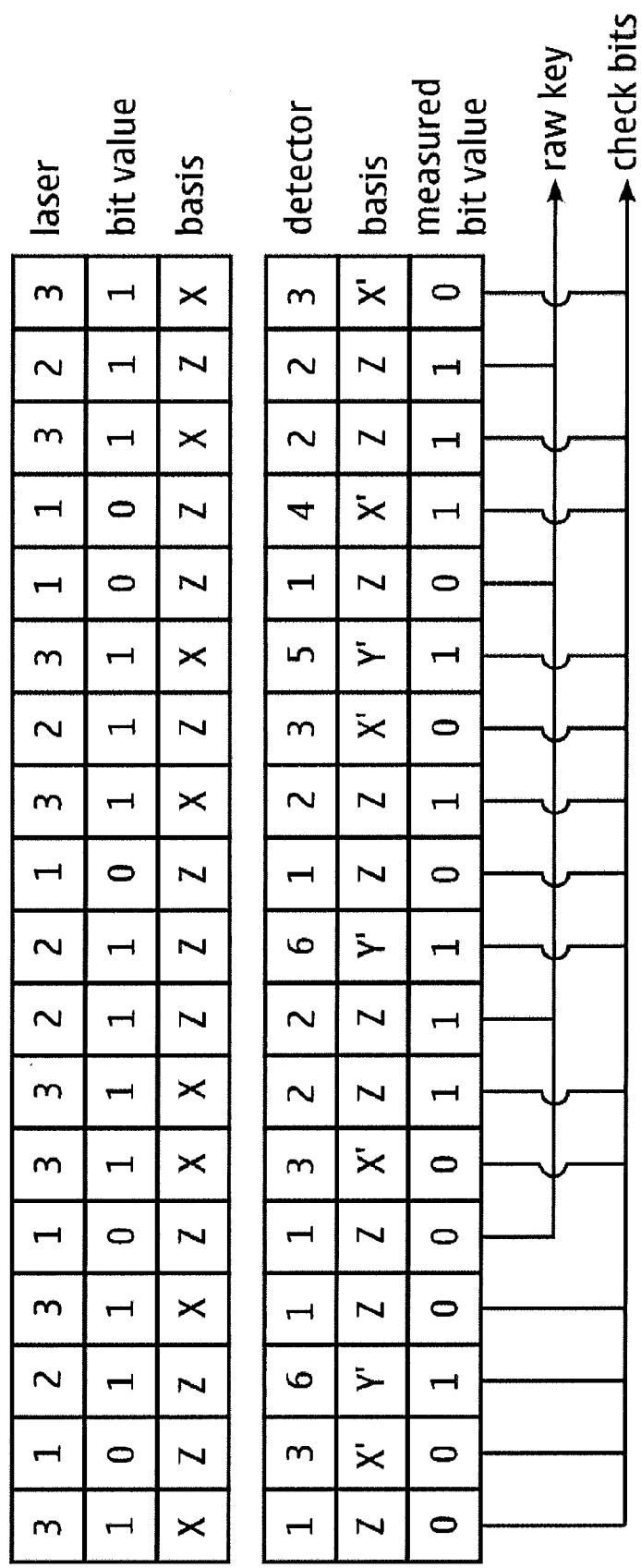
FIG. 10 is a diagram visualising key sifting process.

Any random/non-valid detection events can be rejected. Terminal B maintains a record of valid detector events for all six detectors. The record of the measured bases and the timing information is sent at 73 to terminal A. Terminal A correlates the record received at 74 from terminal B with its own record and returns at 75 the sent basis states and the bit values if the basis is not z for both terminal A and terminal B. Terminal B receives this information at 76 and obtains a raw key and check bits at 77. A small number of bit values for the case when both bases are z can be sent for the purpose of estimating the error rate at 78 for an error correction procedure. Thus not all bits where both bases are z may be used for the raw key. A small number can be used for parameter estimation and error correction step. Terminal A then performs a sifting of the received information and uses it to (see FIG. 10) obtain a raw key from events where the basis was z for both terminal A and terminal B. The sifting can consist of retaining only bits where the basis was z for both terminals. The raw key in FIG. 10 example would then be 0101. The remaining events (check bits) are used to detect the presence of an eavesdropper. The presence of an eavesdropper may be detected for example based on a parameter estimation process.

Based on the error estimate in the z-z basis an error correcting code is constructed at 79 by terminal B and is sent at 80 to terminal A over a wireless link between the terminals. An example of a possible error correction code is a Low-density parity-check (LDPC) code. Terminal A receives the code at 81 and computes at 82 an error syndrome from the error correcting code and returns the error syndrome at 83 to terminal B. Terminal B receives the error syndrome at 84 and then performs error correction at 87 using e.g. a sum—product algorithm. Authentication may be performed at 85 and 86.

After successful error correction terminal A and terminal B have identical raw keys.

Errors may be introduced during transmission either by random events or an eavesdropper. The raw key held by the recipient terminal may have errors which need to be corrected, while the key in the sender terminal is correct since it comes from a guaranteed random source. Error correction can take place in terminal B.

During the procedure an eavesdropper may have had the possibility to collect information about the key in two stages: during the transmission of optical pulses from terminal A to terminal B and during the unsecure exchange of information during error correction. Loss of information to an eavesdropper during optical transmission can be estimated from the check bits. An example for this is discussed below.

In order to estimate error rates we consider the vector $r_b=(x_b, y_b, z_b)$ corresponding to each transmitted direction $b=(x+, z+, z-)$, where $$x_b = p_{x+|b} - p_{x-|b}$$

and similarly for the polarisations y and z with the probability to register a click in detector $a=(x+, x-, y+, y-, z+, z-)$ given by $$p_{a|b} = D_a/S_b.$$

In the above $D_a$ is the number of detector events in detector a and $s_b$ is the number of sent photons in direction b.

Similar considerations apply for polarisations y and z. For an errorless transmission we obtain $r_{x+}=(\cos \alpha, \sin \alpha, 0)$, $r_{z+}=(0, 0, 1)$ and $r_{z-}=(0, 0, -1)$, where $\alpha$ is the misalignment of the polarisations between terminal A and terminal B. Note that for an errorless transmission the length of the vector is unity, and thus independent of the misalignment. Any eavesdropping attempt will result in deviations from this ideal behaviour. The leaked information can be estimated from this using an appropriate method.

The potential loss of information to an eavesdropper during error correction is the number of bits exchanged during error correction which are correlated with the raw key. In order to obtain a secure key the partially secure raw key can be shortened using a two-universal hash-function at privacy amplification step 88. The amount of shortening depends on the amount of information leaked during error correction and the estimated leak during the optical communication.

In the above examples single photons per pulse were emitted in each polarisation. This is not necessary in all scenarios and multiple photons may be also used in certain applications.

The embodiments may be beneficial e.g. because a simple polarisation based quantum key distribution system may be provided that tolerates misalignment of polarisation direction between a sender and a receiver device and a precise alignment of the polarisations (HP) is not necessary. The scheme may make efficient use of distributed photons as no send/measure pairs are discarded.

It is noted that whilst embodiments have been described using a mobile system as an example, similar principles can be applied to any other communication system where security needs to be provided between communicating devices. For example, instead of communications between a mobile station and a base station the communications may be provided between two mobile devices, or between two static or semi-static devices. For example, the principles can be applied where no fixed equipment is provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein.

Figure 11:
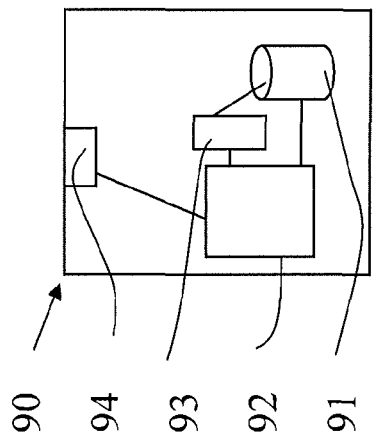
FIG. 11 shows an example of control apparatus.

Mobile devices, base stations and other communicating devices are typically controlled by at least one appropriate controller apparatus so as to enable operation thereof and control of wireless communications between the devices and/or the base station. The control apparatus can be interconnected with other control entities. FIG. 11 shows an example of a control apparatus 90 capable of operating in accordance with the embodiments, for example to be coupled to and/or for controlling devices 10 and 20. The control apparatus can be configured to provide control functions in association with determination of various information, generation and communication of information between the various entities and/or control functions based on such information by means of the data processing facility in accordance with the certain embodiments described above. For this purpose the control apparatus comprises at least one memory 91, at least one data processing unit 92, 93 and an input/output interface 94. The control apparatus can be coupled to a receiver and/or transmitter of the relevant node via the interface. The control apparatus can be configured to execute an appropriate software code to provide the control functions. The control apparatus and functions may be distributed between a plurality of control units.

The required data processing apparatus and functions may be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. A method comprising:
emitting from a sender device randomly photons in a first polarization, a second polarization and a third polarization without aligning a polarization system in a plane perpendicular to the first and second polarizations with a recipient device, the recipient device being adapted for detection of photons in association with six polarizations,
storing in a memory of the sender device a bit value and a polarization corresponding to each of the emitted photons,
receiving information of detected photons from the recipient device in the absence of having sent to the recipient device information about the polarizations used for the emitted photons,
determining photons where the same polarization basis consisting of the third polarization and its opposite was used by the sender device and the recipient device and the bit values match between the stored bit value and the received detected photon,
error correcting the determined photons using the received information and the stored bit values and polarizations; and
constructing a cryptographic key using only the bit values remaining after the error correcting and storing said key in the memory for use with the recipient device.

2. The method according to claim 1, comprising
determining use of a different polarization basis by the sender device and the recipient device for a photon, and communicating information of sender basis and bit values in response to determination of at least one photon with the different polarization basis.

3. The method according to claim 1, comprising emitting a single photon per pulse in each of the six polarizations.

4. A method comprising
receiving at a recipient device photons from a sender device via an optical channel emitted on a first polarization, a second polarization and a third polarization without aligning a polarization system in a plane perpendicular to the first and second polarizations with the sender device,
selecting randomly polarization basis for measurement of received photons for detection of photons on six polarizations,
sending information of detected photons in association with three polarization bases to the sender device,
receiving information from the sender device of photons where the same polarization basis was used by the sender device and the recipient device;
constructing a raw key using only bit values corresponding to the detected photons associated with the same polarization basis received from the sender device;
error correcting the raw key; and
constructing a cryptographic key using only the bit values remaining after the error correcting and storing said key in a memory of the recipient device for use with the sender device.

5. An apparatus comprising: at least one processor; and at least one memory including computer program instructions, wherein the at least one memory and computer program instructions are configured to, with the at least one processor, cause the apparatus at least to:
cause emission of photons using randomly a first polarization, a second polarization and a third polarization for sending the photons without aligning a polarization system in a plane perpendicular to the first and second polarizations with a recipient device, the recipient device being adapted for detection of photons in association six polarizations,
store in the at least one memory a bit value and a polarization corresponding to each of the emitted photons,
receive information of detected photons from the recipient device in the absence of having sent to the recipient device information about the polarizations used for the emitted photons,
determine events where the same polarization basis consisting of the third polarization and its opposite was used by the sender device and the recipient device and the bit values match between the stored bit value and the received detected photon,
error correct the determined photons using the received information and the stored bit values and polarizations; and
constructing a cryptographic key using only the bit values remaining after the error correcting and storing said key in the at least one memory for use with the recipient device.

6. The apparatus according to claim 5, wherein the apparatus is further caused to determine use of a different polarization basis by the sender device and the recipient device for a photon, and cause communication of information of sender basis and bit values in response to determination of at least one photon with the different polarization basis.

7. The apparatus according to claim 5, wherein the apparatus is further caused to use synchronized timing for the photons.

8. The apparatus according to claim 5, wherein the apparatus further comprises a quantum random number generator for providing randomness for the basis selection.

9. The apparatus according to claim 5, wherein the apparatus is further caused to
correlate a time synchronized record of photons detected by the recipient device with a record of photons maintained by the sender device, and
sift the information to obtain raw keys based on bits in times when the same basis was used by the sender and recipient devices.

10. A recipient device comprising at least one processor; and at least one memory including compute program instructions, wherein the at least one memory and computer program instructions are configured to, with the at least one processor, cause the recipient device at least to:
randomly select polarization basis for measurement of photons received from a sender device emitted on a first polarization, a second polarization and a third polarization without aligning a polarization system in a plane perpendicular to the first and second polarizations, and
detect photons in association with said six polarizations,
cause sending of information of detected photons in association with three polarization bases to the sender device,
receive information from the sender device of photons where the same polarization basis was used by the sender device and the recipient device;
construct a raw key using only bit values corresponding to the detected photons associated with the same polarization basis received from the sender device;
error correct the raw key; and
construct a cryptographic key using only the bit values remaining after the error correcting and store said key in a memory of the recipient device for use with the sender device.

* * * * *